Jan. 31, 1961

D. T. CAHILL 2,969,772

FLUID OPERATED DEVICE

Filed Jan. 5, 1960

INVENTOR.

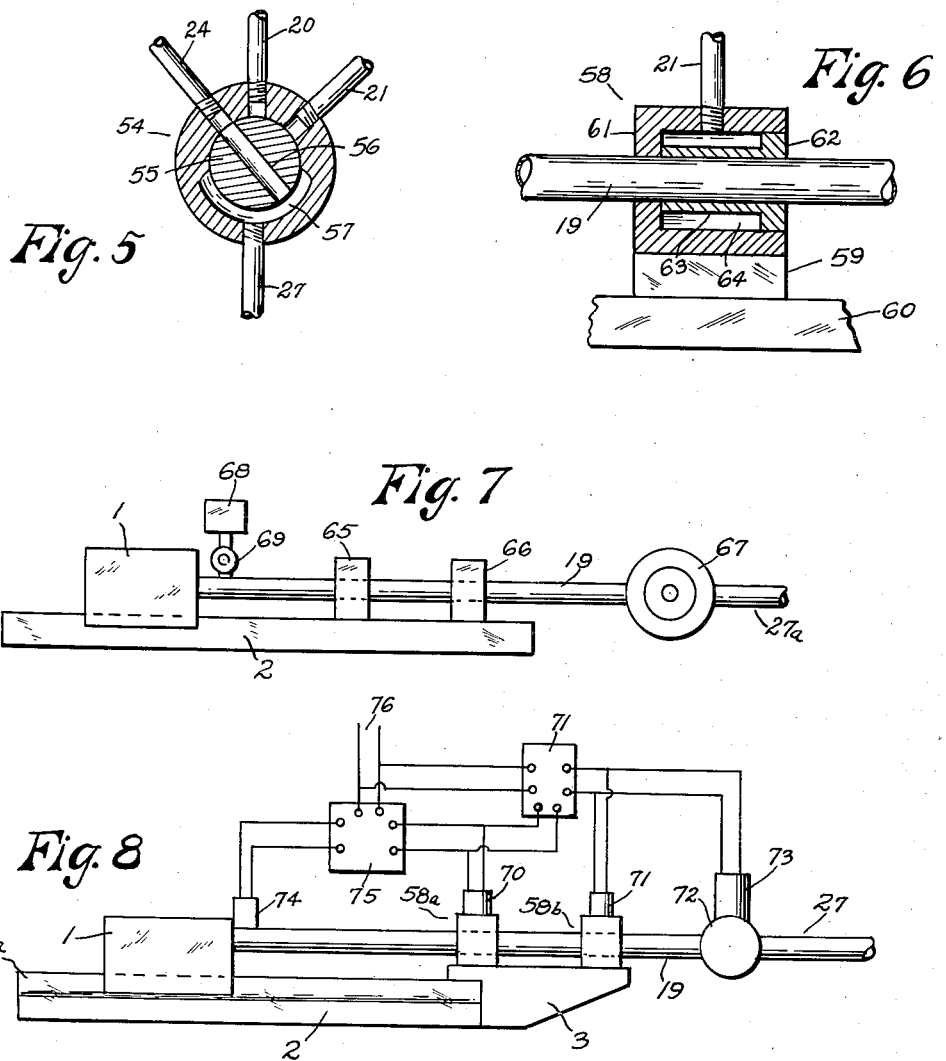

United States Patent Office 2,969,772
Patented Jan. 31, 1961

2,969,772
FLUID OPERATED DEVICE

Daniel T. Cahill, Glen Head, N.Y., assignor to Specialties, Inc., Syosset, N.Y., a corporation of New York Filed Jan. 5, 1960, Ser. No. 577
17 Claims. (Cl. 121—40)

This invention relates to means for producing very small movements of an object which may be a member of a machine tool or any other device.

In operating machine tools of various kinds in which a tool and workpiece are moved relatively, it is often desirable to "inch" the tool along relative to the workpiece, or vice versa. This inching movement or displacement might be in steps of 20 millionths of an inch or less. Likewise, this fine control device can be used to position diffraction gratings, printed circuit and other matrices, jewels for cutting operations, in grinding operations, spinnerets, forms for making television screens, and for other operations requiring accurate, controlled movement.

It is an object to provide a power device for producing movement of an object in small predetermined steps.

Another object is to provide a power device for making small controlled displacements of an object at relatively rapid rate.

A further object is to provide means for producing small, predetermined displacements of an object.

An additional object is to provide a device or system employing hydraulic or pneumatic power for producing very small displacements of an object.

Other objects will be apparent in the specification.

In the drawings:

Figure 5 is a sectional elevation of a three way valve.

Figure 6 is a part sectional side elevation of a fluid operated clamp.

Figure 7 is a side elevation of a modified inching device.

Figure 8 is a side elevation of an electrical type inching device for providing small displacements of a tube or other means.

Figure 1:
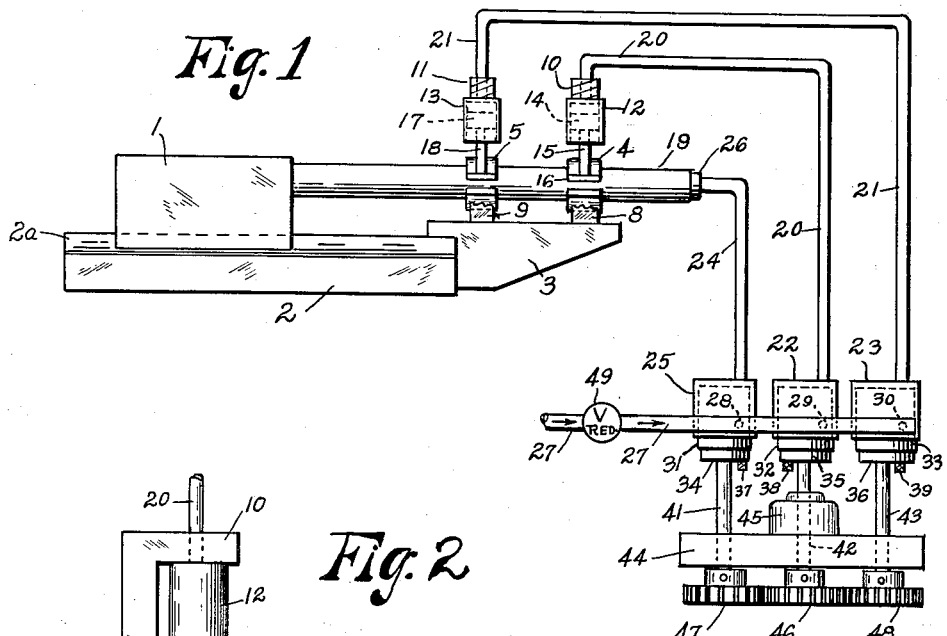
Figure 1 is a side elevation of my shock force mechanism or control system showing some elements broken away.
Figure 2:
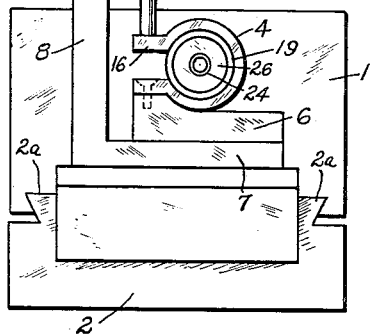
Figure 2 is a front elevation of the slide and power actuators of the device of Figure 1 but of somewhat different proportions.

In Figure 1 member 1 may be a table for holding workpieces or the like, in which case member 2, on which it is slidable, may be a fixed or movable part of the machine. Likewise, member 1 may be a cross slide on table 2 which may be movable. The flared track portions 2a of member 2 guide the member 1 for sliding motion to the right or left. Anvil type member 3 is attached to member 2 and supports spaced clamps or bands 4 and 5 which may be fastened by screws to blocks similar to block 6 shown in Figure 2. Attachment may also be made by welding or otherwise. The blocks are fastened to legs 7 which are integral with posts 8 and 9 having horizontal bars 10 and 11. The posts are shown broken away in Figure 1 to reveal the clamp construction.

Cylinder 12 is fastened to bar 10 and similar cylinder 13 is fastened to bar 11. Piston 14 is slidable in cylinder 12 and, by means of attached rod 15, which may be suitably guided, the piston movement may be used to tighten clamp 4. The end of rod 15 presses against ear 16 of resilient clamp 4. Similar piston 17 is slidable in cylinder 13 and has attached rod 18 which may be moved to tighten clamp 5 around tube or cylinder 19 an end of which is attached to slide 1 in any suitable manner. This slide is linearly movable along tracks 2a.

Tube 20 passes through a hole in arm or bar 10 and is threaded or otherwise fastened in leak-proof manner in an opening in the end of cylinder 12. Tube 21 is similarly fastened in an opening in the end of cylinder 13. Tube 20 is connected with the discharge port of valve 22 and the tube 21 is connected with the discharge port of valve 23. Tube 24 connects the discharge port of valve 25 with the interior of cylinder or tube 19, through bored plug 26, a leak-proof fit being provided. Fluid supply pipe 27 is attached to each valve and feeds fluid to the valves through ports 28, 29 and 30, the fluid being supplied from a pressure tank or other source.

Figure 3:
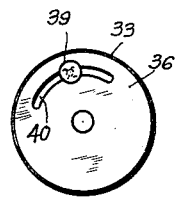
Figure 3 is a face view of adjustable drive plates or discs as used in the device of Figure 1.

The respective cylindrical apertured valve elements, 31, 32, and 33 are rotatable in the associated valve casings to control flow of fluid from pipe 27 to the respective tubes 24, 20, and 21. These rotary valve elements may be attached coaxially to the respective valve discs 34, 35, and 36 by means of thumbscrews 37, 38, and 39, which pass through curved slots like slot 40 (Fig. 3), and are screwed into threaded holes in the associated members 31, 32, 33. The discs 34, 35, 36 are fastened coaxially to respective shafts 41, 42, and 43, which are rotatable in bearings in bar 44 which may be fastened to member 3 or to any suitable part of the machine; or bar 44 may be fixed and tubes 20, 21 and 24 may be flexib'e if table 2 is movable.

Motor 45 is attached to bar 44 and the motor shaft 42 is rotatable in a bearing in this bar, as described. Gear 46 is fastened to shaft 42 and similar meshed gears 47 and 48 are attached to respective shafts 41 and 43. Since the gears are identical the three rotary valve elements will be rotated at the same speed as that of the motor shaft 42, when the motor is energized. The phasing or relative times of opening and closing of the valves can be adjusted by loosening the thumbscrews and rotating the disc pairs 31—34 and 33—36 through the desired displacements before tightening the thumbscrews 37 and 39 again.

Either a liquid such as oil, or a gas like air, can be used in the system, but it is preferable that the source to which supply pipe 27 is connected shall provide fluid under relatively high pressure. Generally, liquid is to be preferred to air but the choice will depend upon the conditions.

The clamps 4 and 5 are adapted to hold tube 19 tightly against linear movement relative thereto, when the respective cylinders 12 and 13 are supplied with high pressure fluid. This pressure may ordinarily vary from a few hundred pounds per square inch to several thousand pounds per square inch, depending upon the types of materials used in the desired displacements and other pertinent characteristics. Adjustable reducing valve 49 is connected in line 27 in order to regulate the pressure of the system.

In operation, when it is desired to inch slide 1 to the left thumbscrews 37, 38, and 39 are loosened and valve cylindrical members 31, 32, and 33 are shifted angularly with respect to discs 34, 35, and 36 until the desired phasing or relative timing of the opening and closing of valves 25, 22, and 23 is obtained. Suitable scales on the discs may be provided for setting the phasing. Then the thumbscrews are tightened and valve 49 is set to the desired value of pressure; which can be done with relation to a pressure scale. Motor 45 is then started by closing a connected electrical circuit and valve 22 will first be opened to cause element 4 to clamp tube 19 tightly. While the tube is being held by clamp 4 valve 25 is suddenly opened to send a shock pressure wave of fluid down tube 19 from right to left. This results in slightly elongating tube 19 and, while it is elongated the valve 23 is suddenly opened by rotating element 33 which causes fluid in line 21 suddenly to operate clamp 5 thus binding tube 19 in its stretched leftward position. As the valves are rotated clamp 4 is next released and is again clamped around tube 19 after the adjacent portion has shifted slightly to the left to relieve the stress. Clamp 5 is next released and the cycle is then repeated at rapid rate, resulting in "inching" tube 19 and attached slide 1 to the left. The displacement may be halted by stopping the motor or closing valve 49 or another valve.

In order to reverse the direction of creep of tube 19 the direction of rotation of motor 45 is reversed, or the discs 34, 35, and 36 can be re-set to cause clamp 5 to be tightened first, then admission of fluid through valve 25 to produce a fluid shock wave in cylinder 19 to lengthen it, then clamp 4 is tightened to hold the tube in lengthened position toward the right, and the cycle is repeated rapidly as the motor rotates. This results in the creeping of tube 19 and slide 1 to the right. The speed of the motor may be controlled by a rheostat or other speed control means.

The extent of displacement of tube 19 for each step or cycle can be adjusted by regulating valve 49 to control the effective pressure and the rate of step movement can be controlled by regulating the speed of the motor. It should be observed that the clamps do not provide longitudinal tensile or compressive stresses in tube 19. All they do is to hold or release the tube with respect to displacement in axial direction. The shock force for causing longitudinal change of dimension of tube 19 is provided by the relatively high pressure fluid admitted to that tube through connected tube 24. The clamps may be lined with friction material like brake lining or these clamps could be of electromagnetic construction to hold both by frictional effects and by magnetic attraction.

Figure 4:
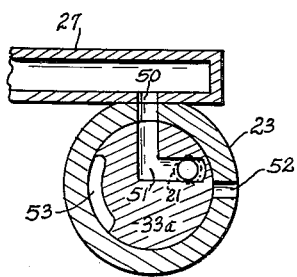
Figure 4 is a sectional view of a control valve for the fluid.

When the valves 25, 22, 23 are closed the pressure in the respective lines or tubes 24, 20, and 21 should be relieved. Since the displacement of the fluid in the lines is so small, particularly in the case of liquid, the pressure may be relieved by leakage past the valves or pistons or by expansion. The valves 25, 22, and 23 may be designed for the purpose, as shown in Figure 4. Pipe or manifold 27 can supply fluid to valve 23 through port 50. The rotary element 33a of the valve has channel 51 which, during rotation of element 33a, is periodically turned to the position shown, so that channel 51 connects port 50 and tube 21. The valve casing is provided with fluid discharge port 52 and arcuate recess 53 is made in element 33a. Therefore, as element 33a is rotated clockwise the channel 51 is periodically brought into register with port 50 and tube 21 to admit fluid under pressure to that tube. Further rotation seals off tube 21 under pressure which is held long enough for the effective operation of the cycle previously described. Then recess 53 comes into register with port 50, thereby relieving the pressure in tube 21. Further rotation of element 33a causes fluid in recess 53 to be discharged from port 52 by centrifugal force so that the recess is ready to receive fluid during the next cycle. The fluid discharged may be collected and piped back to the supply tank. Since only a very small amount of fluid need be discharged, the loss of fluid would not be a serious matter. The resiliency of the system can in many cases make the discharge of fluid unnecessary.

It is assumed, of course, that a material having a certain degree of elasticity, like metal for instance, will be used for the shock force tube which is momentarily elongated or changed in dimension. It is further assumed that the stress produced in the tube is not sufficient to create permanent strain in the tube material.

The tube 19 is a simple tube or pipe of any material which can be stretched to a small degree without producing a permanent strain in the material. Metals, plastics, and similar materials are satisfactory although metal is preferred for most purposes. The tube is sealed at the end attached to member 1 and the other end has fluid supply pipe 24 sealed to it through the agency of annular plug or ring 26. The joint may be welded or brazed to insure that fluid from pipe 24 can enter tube 19 without leakage. The pipe 24 should be sufficiently flexible to allow adequate movement of tube 19.

The elongation of tube 19 is effected in the following manner: First, clamp 4 is tightened around tube 19 to hold it against slippage in either direction along the axis. Then a wave of high pressure fluid is suddenly admitted to pipe 24 and this pressure wave travels in tube 19 finally striking the sealed end of that tube. The shock force due to sudden stoppage of this pressure wave and at least partial reflection produces a force on member 1 pushing it to the left for a short distance and stretching the portion of tube 19 on the left side of clamp 4, as seen in Figure 1. Then if clamp 5 is tightened while the tube is in stretched condition the portion of the tube 19 between clamps 4 and 5 will shorten, due to the elasticity of the tube material when clamp 4 is released. Therefore when clamp 4 is again tightened it will grip a portion of the tube which, before was a little to the right of this clamp. Then clamp 5 is released and the cycle is repeated, resulting in inching the tube to the left, through the clamps. Reversing the order of these operations will cause reversal of direction of movement of the tube.

The three-way valve 54, shown in Figure 5, may be substituted for the three valves 25, 22 and 23 of Figure 1. The supply and distribution pipes 27, 24, 20 and 21 are connected as indicated in Figure 1. As valve member 55 of cylindrical shape is rotated the channel 56 connects fluid supply chamber 57 with these distribution pipes, consecutively. Pipe 27 supplies chamber 57 with fluid. The valve periodically cuts off fluid flow due to element 55 blocking egress ports. The spacing of the ports and of channel 56 may be arranged to produce the timing action desired.

In Figure 6, the modified tube clamp is fastened to supports 59–60 which may be fixed parts of a machine. Tube 19, similar to tube 19 of Figure 1, is passed through a bore in wall 61 and in wall 62 having integral, relatively thin metal or other sleeve 63 closely surrounding tube 19. Element 62–63 may be threaded into element 58 or it may be welded or otherwise fastened so that there is no leakage of fluid from annular chamber 64 surrounding sleeve 63. Fluid supply pipe 21 is threaded into a bore leading to chamber 64, in leak-proof manner.

In operation, when fluid under pressure is supplied to chamber 64 the sleeve 63 will be compressed radially so that tube 19 will be pinched or clamped and it is tightly held. The greatest flexing will be in a mid-plane of the sleeve and the clamping pressure will be relieved when the pressure in pipe 21 is reduced. This construction has the advantage that tube 19 is gripped evenly all around its circumference.

In Figure 7, blocks 65 and 66 are attached to machine bed or other support 2 and are bored to receive tube 19 which is fitted very closely in the aligned bores but is movable therethrough. Tube 19 is attached to slide 1, as in Figure 1, the slide being movable on bed 2. Rotary valve 67 is connected between tube 19 and fluid supply pipe 27a and alternately opens and closes the connection between the tube and pipe as valve 67 is rotated. Damper or filter chamber 68 is connected to tube 19 through valve 69 which may be closed when desired. The damper is for the purpose of preventing undesired oscillations of the fluid or to quench harmonics of the fundamental frequency as determined by the rate of opening and closing valve 67.

In operation, a motor or other device opens and closes valve 67 at desired frequency so that a succession of pressure waves travel down tube 19 in leftward direction. As a pressure peak or gradient reaches block 66 the tube 19 is expanded sufficiently to bind the tube tightly in the block which clamps it against movement in axial direction. Then the pressure front continues and similarly causes block 65 to bind the tube momentarily. Finally, the pressure front strikes the end of the tube closed by attached block or slide 1 so that tube 19 will be stretched if block 66 is binding the tube at the moment. In effect, multiple wave fronts or wave peaks are used and if the spacing of blocks 65 and 66 and the frequency of pressure pulsations are chosen properly the tube 19 will be bound by block 66 first, then the tube will be stretched and then block 65 will bind the tube and the cycle will be repeated, causing the tube to creep through the blocks.

Valve 69 may be opened, if desired, to prevent or reduce the effect of standing waves or similar effects which may be undesirable in many cases. The damper 68 may have labyrinths, or resilient or porous material to absorb pressure fronts to the desired degree. An alternative mode of operation is to let element 65 be a guide and not a clamp and the shock force of the waves can be used to move slide 1 in small increments. In this case element 66 may be used as a clamp at the desired times or it may also be merely a guide. In the various cases described the fluid connection to tube 19 is of course flexible or movable so that movement of that tube will not be impeded.

In Figure 8, like parts are given similar numerals as in Figure 1. Clamps 58a and 58b are attached to anvil 3 and are operated by electromagnetic windings 70 and 71 which may include solenoids or magnets for causing clamping of tube 19 when they are energized. These clamps may be opened or closed by magnetic attraction or as a result of armatures similar to elements 15 and 18 of Figure 1 acting to bind the clamps. Valve 72 controlling flow of fluid from supply pipe 27 to tube 19 is a magnetic valve which may be normally closed by spring action but which is opened when electromagnetic winding 73 is energized.

The unit 74 attached to tube 19 at the closed end thereof is a pick-up or sensing device which detects the peak pressure waves. This device may be operated by sound, by physical shock, or it may be directly connected with tube 19 to be operated by pressure. When a pressure peak occurs at that point, a current or voltage is generated by movement of a magnet or coil or a contact is closed, or in other suitable manner, to apply an electrical pulse to amplifier 75 which in turn applies an electrical surge or current to winding 70 and to electrical timer 71. This timer, by means of R-C circuits or in other well known manner, applies current to windings 71 and 73 at predetermined times with respect to the times of application of current to winding 70. The units 75 and 71 are supplied with current from lines 76.

In operation, valve 72 is opened momentarily to send a pressure wave down tube 19 until block or slide 1 is reached. The pick-up 74 is then actuated and, after an interval, timer 71 applies current to windings 71 and 73, causing clamp 58b to hold the tube 19. Then the next actuation of unit 74 causes amplifier 75 to apply current to winding 70, causing clamp 58a to hold tube 19 in stretched condition and shortly after that the timer 71 deenergizes winding 71 to cause clamp 58b to release tube 19. Then timer 71 closes the circuits to windings 71 and 73 again and the valve is opened and clamp 58b holds the tube again momentarily and the other actions described then occur in repeated cycles, causing tube 19 to creep through the clamps in small increments of movement. The direction of movement can be determined by the phasing, as described in connection with Figure 1.

The cycling or switching circuits may be operated by flip-flops, counting circuits, other electronic units. It is possible to create pressure waves in tube 19 by means of a piston movable in the tube and this piston may be actuated by means of a solenoid or other electrical or mechanical device.

What I claim is:

1. In an actuating device, a tubular member closed at one end, a first clamp for holding said member periodically against movement relative thereto, a second clamp spaced from said first clamp and adapted periodically to hold said member against movement relative to said second clamp, means for supplying fluid under pressure to said tubular member, means for actuating said clamps to cause clamping or release of said tubular member, and means to cause actuation of said fluid supplying means and said clamps in phased relationship to cause movement of said tubular member linearly relative to said clamps.

2. The device as described in claim 1, and including a member attached to the closed end portion of said tubular member.

3. The device as described in claim 1, and including means supporting said clamps.

4. In an actuating device, a tubular member closed at one end, a first clamp for holding said member periodically against movement relative thereto, a second clamp spaced from said first clamp and adapted periodically to hold said member against movement relative to said second clamp, means for supporting said clamps, means for supplying fluid under pressure to said tube periodically, means for actuating said clamps to cause clamping or release of said tubular member, and means for controlling said fluid supplying means and said clamp actuating means in phased relationship to cause movement of said tubular member relative to said clamps.

5. The device as described in claim 4, said clamp actuating means including a plurality of cylinders and pistons movable therein.

6. The device as described in claim 4, said clamp actuating means including fluid operated means, and said controlling means including a plurality of valves for controlling application of said fluid to said fluid operated means and to said tubular member.

7. The device as described in claim 4, said clamp-actuating means including fluid-operated means, and said controlling means including a plurality of valves for controlling application of said fluid to said fluid-operated means and to said tubular member, and including electromagnetic means for operating said valves.

8. The device as described in claim 4, and including means for regulating the pressure of fluid supplied to said tubular member.

9. In an actuating device, a tube closed at one end, a pair of spaced clamps substantially surrounding said tube and adapted periodically to prevent movement thereof relative to said clamps, means supporting said clamps, means attached to said supporting means and including a pair of cylinders and pistons movable therein for actuating said clamps, piping for supplying fluid under pressure to said cylinders and to said tube, valve means for controlling flow of fluid to said piping and means for timing the relative opening and closing of said valve means to supply momentary fluid pressure repeatedly first to one said clamp, then to said tube and then to the other said clamp.

10. The method of producing small increments of movement of a hollow member, said method comprising, fastening a portion of said member against movement in predetermined direction at the fastening location, applying fluid under pressure to said hollow member to cause a change of dimension thereof, fastening another portion of said member against movement in said predetermined direction, and releasing said first named portion.

11. The method of producing small increments of movement of a hollow member in predetermined direction, said method comprising the steps of, fastening a first portion of said hollow member against relative movement in said direction at the fastening location, applying fluid under pressure to said hollow member to cause a change of dimension thereof, fastening another portion of said hollow member against relative movement in said direction at the fastening location of said other portion, then releasing the application of fluid pressure to said hollow member, and repeating the described steps cyclically.

12. In an actuating device, an elongated hollow member, a pair of spaced fluid pressure operated fastening devices for holding portions of said member against axial movement relative to said devices, means supporting said devices, means including valve means for supplying fluid under pressure to said hollow member and said fluid pressure operated fastening devices, and means for opening and closing said valve means in sequential relationship to supply fluid momentarily repeatedly to one said fastening device, then to said hollow member, and then to the other said fastening device.

13. The device as described in claim 12 and including means for timing the opened and closed intervals of said valve means.

14. The device as described in claim 12 and including means for regulating the rate of opening and closing said valve means.

15. The device as described in claim 4, and including damping means for regulating pressure waves within said member.

16. The device as described in claim 4, and including pick-up means adjacent said hollow member for detecting pressure fronts, and electrical means electrically associated with said pick-up means for controlling said clamping means and said valve means.

17. The actuating device as described in claim 4, said clamps being electrically operated, and said means for supplying fluid under pressure to said tube periodically, including an electrically controlled valve, an electrical pick-up adjacent an end of said tubular member, and electrical circuit means connecting said pick-up and said clamping means.

References Cited in the file of this patent

UNITED STATES PATENTS

| | | |
|---|---|---|
| 1,443,888 | Sheedy | Jan. 30, 1923 |
| 2,858,105 | Lucas | Oct. 28, 1958 |

FOREIGN PATENTS

| | | |
|---|---|---|
| 30,644 | France | Apr. 20, 1926 |
| | (1st Add. to 595,660) | |
| 951,885 | France | Apr. 25, 1949 |